US012183156B2

(12) United States Patent
Acres

(10) Patent No.: US 12,183,156 B2
(45) Date of Patent: Dec. 31, 2024

(54) SYSTEM FOR PROMOTING PLAY ON ELECTRIC GAMING DEVICES AND ENGAGEMENT WITH CASINO PERSONNEL

(71) Applicant: Acres Technology, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 0 days.

(21) Appl. No.: 18/298,091

(22) Filed: Apr. 10, 2023

(65) Prior Publication Data

US 2023/0351848 A1 Nov. 2, 2023

Related U.S. Application Data

(63) Continuation of application No. 17/122,111, filed on Dec. 15, 2020, now Pat. No. 11,651,652, which is a continuation of application No. 16/528,838, filed on Aug. 1, 2019, now Pat. No. 10,896,576, which is a continuation of application No. 16/015,366, filed on Jun. 22, 2018, now Pat. No. 10,410,470, which is a continuation of application No. 15/403,016, filed on Jan. 10, 2017, now Pat. No. 10,043,346.

(60) Provisional application No. 62/277,727, filed on Jan. 12, 2016.

(51) Int. Cl.
*G07F 17/32* (2006.01)

(52) U.S. Cl.
CPC ...... *G07F 17/3255* (2013.01); *G07F 17/3223* (2013.01); *G07F 17/3227* (2013.01); *G07F 17/3239* (2013.01)

(58) Field of Classification Search
CPC ........................................................ G07F 17/32
See application file for complete search history.

(56) References Cited

U.S. PATENT DOCUMENTS

| | | | | | |
|---|---|---|---|---|---|
| 5,326,104 | A * | 7/1994 | Pease | A63F 3/081 | 902/23 |
| 7,112,134 | B1 | 9/2006 | Erlichman | | |
| 7,611,409 | B2 | 11/2009 | Muir et al. | | |
| 8,016,660 | B2 * | 9/2011 | Walther | G06Q 20/40 | 463/16 |
| 8,821,255 | B1 | 9/2014 | Friedman et al. | | |
| 9,607,471 | B2 | 3/2017 | Thacker et al. | | |
| 9,721,429 | B2 | 8/2017 | Acres | | |
| 10,410,470 | B2 * | 9/2019 | Acres | G07F 17/3223 | |
| 2004/0192431 | A1 | 9/2004 | Singer et al. | | |
| 2006/0189382 | A1 * | 8/2006 | Muir | G07F 17/32 | 463/29 |
| 2006/0287068 | A1 * | 12/2006 | Walker | G07F 17/32 | 463/25 |

(Continued)

*Primary Examiner* — Omkar A Deodhar
(74) *Attorney, Agent, or Firm* — Ballard Spahr LLP

(57) ABSTRACT

A method for promoting play on electronic gaming devices and for promoting engagement with casino personnel comprising in which a code is displayed on a sign. When the code is received in a text from an identified player, drawing entries are associated with the player as a function of play on the gaming devices. At least one drawing entry is also associated with the player when he or she actuates a service button on a gaming device. Drawing prizes, if any, are revealed in response to another text from the player.

20 Claims, 3 Drawing Sheets

(56) References Cited

U.S. PATENT DOCUMENTS

| | | | | |
|---|---|---|---|---|
| 2008/0076571 | A1* | 3/2008 | Frerking | G07F 17/32 463/42 |
| 2008/0268946 | A1 | 10/2008 | Roemer | |
| 2008/0318655 | A1* | 12/2008 | Davies | G07F 17/3274 463/16 |
| 2009/0258691 | A1 | 10/2009 | Jagannatha et al. | |
| 2009/0309352 | A1* | 12/2009 | Walker | G07F 17/329 29/527.2 |
| 2010/0222100 | A1 | 9/2010 | Dragt | |
| 2011/0118008 | A1 | 5/2011 | Taylor | |
| 2011/0263325 | A1 | 10/2011 | Atkinson | |
| 2013/0260861 | A1* | 10/2013 | Vann | G07F 17/34 463/20 |
| 2015/0094129 | A1 | 4/2015 | Acres et al. | |
| 2017/0213419 | A1 | 7/2017 | Acres | |
| 2017/0287277 | A1 | 10/2017 | Acres | |
| 2018/0300985 | A1 | 10/2018 | Acres | |
| 2019/0355214 | A1 | 11/2019 | Acres | |

* cited by examiner

SYSTEM FOR PROMOTING PLAY ON ELECTRIC GAMING DEVICES AND ENGAGEMENT WITH CASINO PERSONNEL

CROSS REFERENCE TO RELATED PATENT APPLICATIONS

This application is a continuation of U.S. patent application Ser. No. 17/122,111, filed Dec. 15, 2020, which is a continuation of U.S. patent application Ser. No. 16/528,838, filed Aug. 1, 2019, now U.S. Pat. No. 10,896,576, issued Jan. 19, 2021, which is a continuation of U.S. patent application Ser. No. 16/015,366, filed Jun. 22, 2018, now U.S. Pat. No. 10,410,470 issued Sep. 10, 2019, which is a continuation of U.S. patent application Ser. No. 15/403,016, filed Jan. 10, 2017, now U.S. Pat. No. 10,043,346, issued Aug. 7, 2018, which claims priority to U.S. Provisional Application No. 62/277,727 filed Jan. 12, 2016, which are hereby incorporated by reference in their entirety.

FIELD OF THE INVENTION

The present application provides a system in which players interact with electronic gaming devices and their mobile computing devices to play a promotional game in a manner that promotes play on the electronic gaming devices and encourages interaction with casino personnel.

Game players—whether money is at risk, i.e., wagered, or not—can chose to play at home on a video console or computer or they can travel to a casino to play in the company of other players. Those who play in a casino have the opportunity to experience more than simply playing the game. From the casino's standpoint, it would be desirable for their player guests to have the best possible experience regardless of whether the player wins or loses. If guests can come, play, and then leave feeling better about themselves, they are more likely to return to play again. A big part of how the player feels about a casino gaming experience relates to how they are treated by casino personnel.

Some casinos make it a point to provide a very high level of customer attention. This may include the manner in which the customer is greeted when he or she first arrives, the manner in which staff interact with the customer during the gaming session, how games and winners are publicized, the nature of promotional games, etc. Casinos that focus on customer attention and service have prospered, and those who fall short are not as profitable. The system that is the subject of this application greatly enhances casino efforts to optimize the customer experience.

Virtually every casino includes at least one service button at each electronic gaming device for use by a player to call a casino employee for various services, e.g., change, a drink order, to report a perceived problem with the machine, or for whatever the player may need. These buttons may be labeled Help, Change, or Drink Request. In practice, the buttons are rarely used. The player may get his or her own change or order a drink from a nearby server. If players had an incentive to press the service button, the casino would have an opportunity to provide the kind of attention and recognition that instills player loyalty to the casino.

DETAILED DESCRIPTION

The present system may be implemented using networks and systems disclosed in applicant's following prior applications: application Ser. No. 14/263,577 for Dispatch System Having Control Shared with Dispatch Service Providers, filed in the US Patent and Trademark Office on Apr. 28, 2014 ("the dispatch system"); application Ser. No. 14/538,597 for Optimizing Drawing Prize Awards, filed in the US Patent and Trademark Office on Nov. 11, 2014 ("the promotional game"); and application Ser. No. 14/502,695 for Method and Apparatus for Communicating Information About Networked Gaming Machines to Prospective Players, filed in the US Patent and Trademark Office on Sep. 30, 2014, all of which are incorporated herein by reference.

Figure 1:
FIG. 1 is a depiction of a virtual character on a video display.

At the outset, the present system and its manner of operation will be described from the perspective of a player arriving at a casino in which the system is installed. In FIG. 1, a virtual character is presented on a video display in the manner described in the prior applications. This display is located at one of the entrances, and a similar display is located at each other entrance. Although not depicted in the figure, three 2-digit numbers are displayed in the lower right corner of the video display in FIG. 1, for example:

One of the three displayed numbers changes to a different number approximately every 15 seconds under control of programming code in a memory accessible by the system. When each player arrives, he or she is instructed by a sign (not shown) to use his or her mobile phone to text the number on the sign to a displayed phone number to enter a contest. Codes having different numbers of lengths and groups could be equally well used as could codes composed of one or more words. Or a customer could be presented with multiple words and asked to choose one as their lucky code. The phone number is connected to the system in the manner described in the prior application for the promotional game.

If the message is the first one received from that phone (or other communication device) the player is asked to text their player club identification number, which is a unique number associated with the player's record in the player's club, also described in the prior applications. The player texts their player club ID number to the same phone number and is informed via a text in response that he or she is enrolled in the contest. The contest includes a progressive jackpot, along with smaller prizes, which are awarded in a drawing of electronic tickets that are each associated with a different player via their club ID number when drawn from a deck of tickets.

After texting their phone number, in one embodiment, a subsequent text asks if they have a player ID. If the response is yes, the next text asks for the ID number. If no, an employee called by the dispatch system in response to the negative answer helps the player enroll and gives him or her their new ID. The player can then enroll in the promotional game by texting their ID.

This could be accomplished in several ways. An employee distinguished by clothing or a badge could be stationed at predetermined location near the entrance. If the ID is not received by the system, the customer receives a text instructing them to meet with the employee whose distinctive appearance is referenced in the text. Alternatively, the virtual character could instruct the customer to wait near the sign while an employee is called via the dispatch system. In addition, an employee could text the customer, because their phone number was just captured, and arrange to meet the customer to assist with enrollment.

The tickets in this particular promotion are earned as follows: one ticket is awarded upon successfully enrolling for the game as just described. Ten more tickets are awarded when the player accrues 50 points in the player tracking system during this gaming session. A point is typically awarded for each dollar wagered. Once the 50 points are accrued, the player can receive 10 additional electronic tickets by simply pressing the service button at the gaming machine at which they are playing. Again, because the system is tracking the accrued points during the day's gaming session and associating those points with each player who earns them, the system automatically adds 10 additional tickets to the player record when a qualifying player, one who has earned 50 points since entry, actuates the service button.

Different rules for the number of tickets that a single player can earn could be implemented. But under these rules, play is encouraged but does not give big spending players an advantage over the more typical player.

When the host arrives at the gaming device, in response to a call generated by the dispatch system, it presents an opportunity for the employee to congratulate the player and validate the point total, even though the system has already done so. It also gives the host employee the opportunity to inquire into the player's experience and to see if there are any player needs that can be met. In short, it is an opportunity to interact with the player in a manner that provides attention to and recognition of the player.

The rules for this promotional game may be posted at the entrances to the casino as well as at signs at each gaming device or via a display on the gaming device. Because the system is tracking enrolled players and accrual of player points in a database, the system can generate a notice via a display at the gaming machine, either on the game display or on a secondary display, informing the player that he or she may now acquire 10 additional tickets by pressing the service button.

The progressive jackpot in the present promotion begins accruing from a base amount, in this case from $1,000. Unlike other progressive jackpots, funding is from the casino's marketing budget as opposed to being accrued by allocating a portion of wagers to the jackpot. In the present promotion, funding occurs at a rate of $200 per day spread over the casino's hours of operation. A prominent video display shows the current jackpot amount. The maximum award for this promotion is $5,000.

Another video display next to the one that shows the current jackpot amount depicts a jar of tickets, including one with a golden circle around it representing the progressive jackpot. As will be further explained, other tickets but not all, are associated with smaller prize amounts of $5, $50, $100, etc.

When the player concludes his or her gaming session, they know how many tickets they have accrued but not whether or not any are associated with a win. As they leave, they encounter another video image of the virtual character in FIG. 1, which is waving goodbye. A different set of three 2-digit codes appears in a manner as described in connection with the greeting character.

The customer is instructed via a sign or display image to text the goodbye code to the same phone number. Upon doing so, they receive a return text indicating if they have won and how much. Alternatively, or in addition, a winning display could be generated on the character's video display, in the same manner as the REVEAL sequence described in the prior application for the promotional game. Because the system generated has data indicating the player has entered the goodbye code and is a winner, a call is generated in the same fashion as calls are generated in the prior application for the dispatch system. This call sends a casino employee to the exit sign to effect payment for the player. Again, this provides an opportunity to congratulate and recognize the player in a manner that generates good will for the casino. Tickets are invalidated by the system unless the player texts goodbye on the same day they text hello.

Figure 2A:
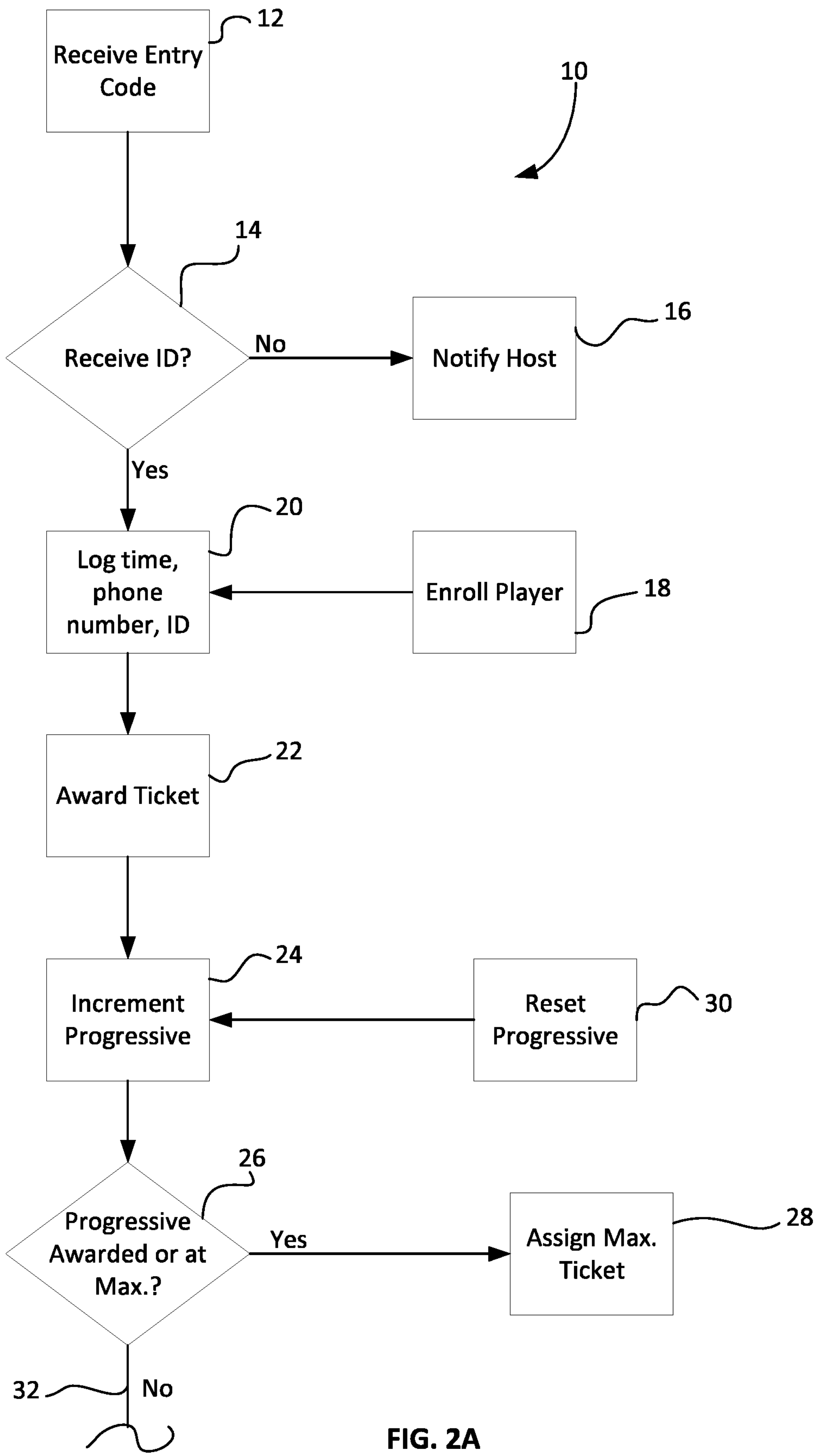
FIGS. 2A and 2B comprise a flow chart showing operation of one embodiment.
Figure 2B:
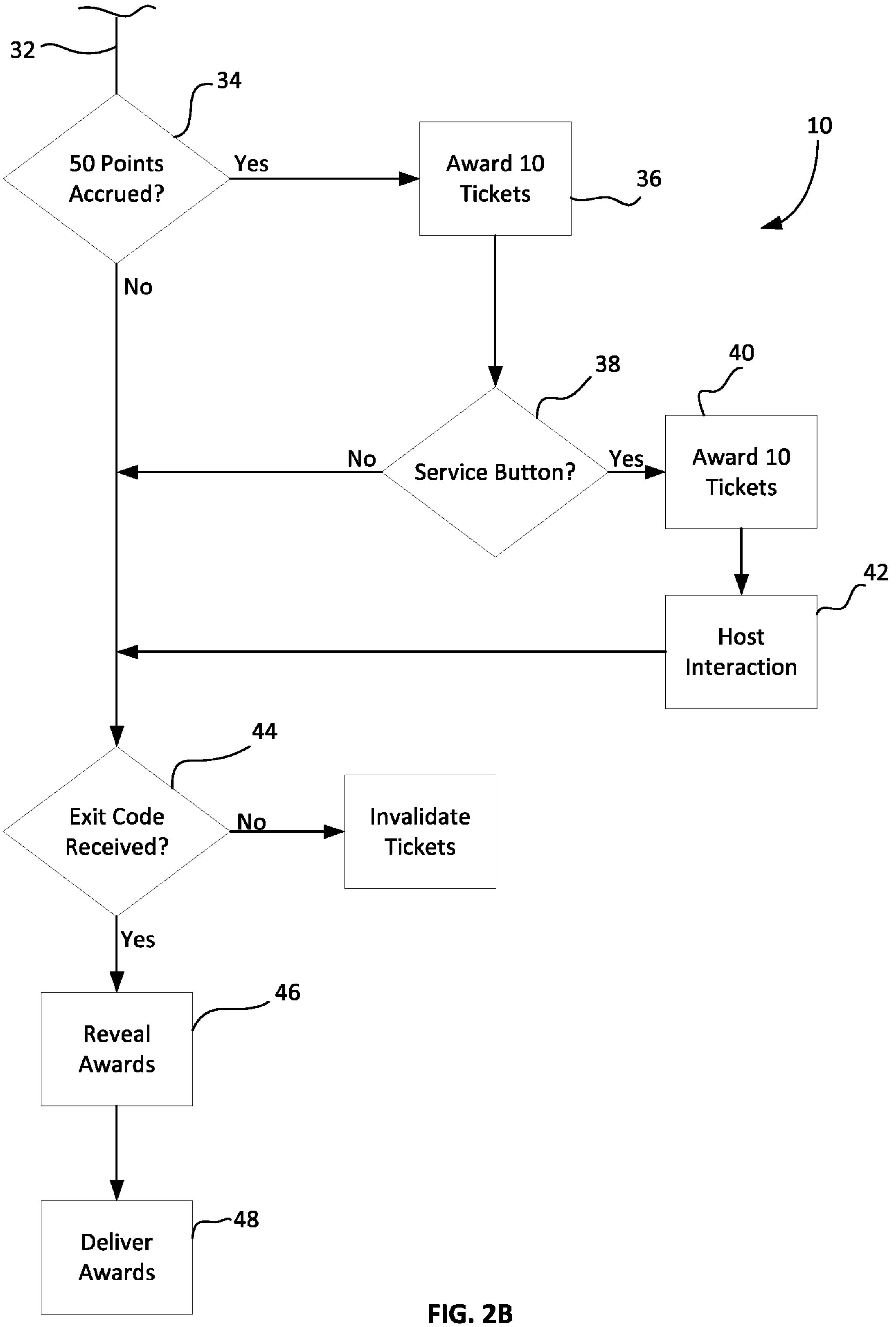

Turning now to FIGS. 2A and 2B, consideration will be given to a process, indicated general at 10, which can be implemented by programming code stored in the system memory. The process implements the promotional game that is the subject of this application along the lines described above.

At 12 the entry code is received by the system as described above. If the time the numbers are texted by the player does not correspond to the numbers displayed at that time, the player is not enrolled in the promotional contest. This prevents players who are not actually present at the entrance, or possibly not even at the casino, from enrolling.

At 14, if the player's club ID is not received within a predetermined time or if the customer indicates via text that they do not have one, a casino host is notified, at 16, via the dispatch system, which generates a call. Or one of the alternate approaches discussed above is used to connect the casino host with the customer. The employee then assists the player in enrolling in the player's club at 18. The player ID can then be submitted at 20, either by the player via text or by the employee via his or her mobile device, thus enrolling the player in the promotional contest. For each player enrolled in the promotional game, the player's phone number, time of entry, player ID and drawn electronic tickets are associated with the player's record in a database maintained by the system. When the player is already enrolled in the player's club and texts their ID, process 10 flows from 12 to 14 to 20.

In the present implementation of the promotional game, each player receives a ticket, at 22, upon enrollment in the promotional game. In the present embodiment an electronic ticket is drawn from a predefined deck of electronic tickets as described in the prior application for the promotional game. The electronic tickets are referred to as winvelopes in the prior application. This ticket is associated with the player's record. It should be appreciated that any method of choosing a winner could be implemented. For example, a purely random selection of award in which there is no prior memory of awards, such as a random selection from a pay table of awards as in a typical slot machine. In this embodiment, the same award, including the top award, could be awarded multiple times in the same contest.

At 24, the progressive amount, which is displayed on a video display (not shown) for the players to see, increments gradually throughout the day. In the present embodiment, the amount increases linearly over time by $200 spread over the casino operating hours.

At 26, the programming code checks to see if the ticket associated with the progressive win has been awarded or whether the incrementing progressive has reached its $5,000 maximum. In the case of a winner of the progressive amount, the ticket is assigned to the player's record as with any other ticket earned. But if the progressive amount reaches its maximum amount, the next progressive prize ticket is awarded to the next person receiving a ticket. Both of these ticket awards occur at 28. The progressive is then reset to its $1,000 base amount at 30, and incrementing from there begins at 24.

Process 10 continues on line 32 to 34, at the top of FIG. 2B. It will be recalled that all players enrolled in the promotional game have their phone number, their player ID, and each ticket awarded associated with their player record. At 34, the system periodically checks all enrolled player records to determine whether the player has accrued 50 points in player's club rewards. If so, 10 additional tickets are automatically associated with the player's record at 36. In one embodiment, the system generates a notice that is presented to the player on a display associated with the gaming device played by the player. The notice informs the player that he or she has won 10 additional tickets as a result of their play and that if they press the service button, 10 more will be awarded.

At 38, the system determines whether the service button at the player's gaming device is pressed. If so, 10 additional tickets are awarded at 40. At 42, a host responds to the service button call via the dispatch system as described in the prior application. Upon arrival the host congratulates the player, confirms the award, and inquires about further services or assistance that could be provided.

If the service button is not pressed at 38 after the award of 10 tickets, the process proceeds to 44. And the same return occurs when the button is pressed and the tickets awarded. At 44, the system determines whether the player has texted the code on the exit sign. After doing so, the system examines each of the tickets accrued by the player, determines the amount won, and notifies the player, at 46, of the amount via text. Alternatively, or in addition, the prizes could be displayed on the exit video display, or a separate one, in a manner similar to that described in the prior application for the promotional game.

Each time a winner is so notified, a call is generated on the dispatch system to a casino employee who comes to the player and delivers the awards at 48. These might be in the form of cash dispensed from a kiosk or at the player's club booth. Any prize could be associated with a ticket, including merchandise, coupons for free play, show tickets, etc.

In the present embodiment, tickets are assigned from a deck of electronic tickets as they are earned as described in the prior application for the promotional game. It is possible to assign the tickets to the player only when he or she exits. Using the former approach the players do not perceive an advantage or disadvantage to playing longer or leaving sooner.

Many different embodiments could be implemented using the system. For example, the award associated with pressing the service button could be, instead of 10 additional tickets, free play, cash, merchandise, etc. Instead of an outright award grant for pressing the service button, it could qualify the player to enter a sub-contest in which those qualifying by earning 50 points were eligible to win further prizes that differed from those who did not so qualify. The service button press could be set to be the entry into the contest itself. In other words, after registering at the entrance as described above, the player is not enrolled in the contest until he or she hits the service button. This would give an opportunity for the called host to start the player's gaming session on a positive note.

In addition, player's wins over time could be tracked and further wins could be limited—or face reduced odds—as a function of prior wins. For example, a player could be limited to a single reward per day, per week, or per month. In addition, the rate of ticket accrual or rewards available could be limited depending upon the time of day, week, or month to provide an incentive to play during hours when the casino is not typically busy.

Some players form relationships with casino employees. This can be noted in the player record so that the call is generated for that particular employee. In addition, certain employees could be called depending upon the information in the player record. For players who wager a lot, a host higher in management could be dispatched. Or for players newly enrolled in the player's club, an employee trained to greet and advise new players could be dispatched.

Hitting the service button in process 10 could result in a text to the player of congratulations and inviting the player to again hit the service button to receive additional tickets or other rewards. Or the text could take the place of a visit from a casino host. A response to the text could provide additional awards or qualify the player to win additional awards. Texting is possible when the player is identified via his or her player club member at the gaming device. The system can pull the phone number from the player record and send the text to the player identified at the gaming device.

In addition, after a qualifying act, some players, based on information in their player record, might be encouraged to hit the service button and receive a host visit while others might simply receive a text, which may invite them to respond to the text to qualify for additional tickets or further awards. Whether to respond with a personal visit from the host could be based on the player's worth, potential worth, length of time the player has been enrolled in the player's club, history with the club, or on relationships with other players.

All of these variations are possible using the process outlined in the prior application for the promotional game. In that game, player groups may be formed with some groups having better odds than others at winning through the use of multipliers. That application also discloses use of cutoffs to limit prizes to any one player.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles.

What is claimed is:

1. A method comprising:

causing a display associated with an electronic gaming device to output one or more codes;

receiving, from a mobile device associated with a player of the electronic gaming device, a message comprising the one or more codes;

determining, based on the message, a player identifier associated with the mobile device;

determining the player identifier is enrolled in a loyalty program; and based on the player identifier being enrolled in the loyalty program, dispatching a service agent to the electronic gaming device.

2. The method of claim 1, wherein the one or more codes are iteratively changed as a function of time.

3. The method of claim 1, wherein the message comprises the player identifier.

4. The method of claim 1, wherein determining the player identifier associated with the mobile device comprises determining, in a database, an association between an identifier associated with the mobile device and the player identifier.

5. The method of claim 1, further comprising enrolling, based on the player identifier associated with the mobile device, the player in a contest.

6. The method of claim 1, further comprising:

determining, based on the player identifier, that the player is eligible for a bonus; and outputting, via the electronic gaming device, the bonus.

7. The method of claim 1, further comprising:

determining the player identifier is not enrolled in a rewards program; and enrolling the player identifier in the rewards program.

8. A system comprising:

a computing device configured to:

cause a display associated with an electronic gaming device to output one or more codes;

receive, from a mobile device associated with a player of the electronic gaming device, a message comprising the one or more codes;

determine, based on the message, a player identifier associated with the mobile device;

determine the player identifier is enrolled in a loyalty program;

based on the player identifier being enrolled in the loyalty program, dispatch a service agent to the electronic gaming device; and the mobile device configured to:

send the message comprising the one or more codes.

9. The system of claim 8, wherein the one or more codes are iteratively changed as a function of time.

10. The system of claim 8, wherein the message comprises the player identifier.

11. The system of claim 8, wherein the computing device is configured to determine the player identifier associated with the mobile device by determining, in a database, an association between an identifier associated with the mobile device and the player identifier.

12. The system of claim 8, wherein the computing device is further configured to enroll, based on the player identifier associated with the mobile device, the player in a contest.

13. The system of claim 8, wherein the computing device is further configured to:

determine, based on the player identifier, that the player is eligible for a bonus; and output, via the electronic gaming device, the bonus.

14. The system of claim 8, wherein the computing device is further configured to:

determine the player identifier is not enrolled in a rewards program; and enrolling the player identifier in the rewards program.

15. An apparatus comprising:

one or more processors; and a memory storing processor-executable instructions that, when executed by the one or more processors, cause the apparatus to:

cause a display associated with an electronic gaming device to output one or more codes;

receive, from a mobile device associated with a player of the electronic gaming device, a message comprising the one or more codes;

determine, based on the message, a player identifier associated with the mobile device;

determine the player identifier is enrolled in a loyalty program; and based on the player identifier being enrolled in the loyalty program, dispatch a service agent to the electronic gaming device.

16. The apparatus of claim 15, wherein the one or more codes are iteratively changed as a function of time.

17. The apparatus of claim 15, wherein the message comprises the player identifier.

18. The apparatus of claim 15, wherein the processor-executable instructions that, when executed by the one or more processors, cause the apparatus to determine the player identifier associated with the mobile device, further cause the apparatus to determining, in a database, an association between an identifier associated with the mobile device and the player identifier.

19. The apparatus of claim 15, wherein the processor-executable instructions, when executed by the one or more processors, further cause the apparatus to:

determine, based on the player identifier, that the player is eligible for a bonus; and output, via the electronic gaming device, the bonus.

20. The apparatus of claim 15, wherein the processor-executable instructions, when executed by the one or more processors, further cause the apparatus to:

determining the player identifier is not enrolled in a rewards program; and enrolling the player identifier in the rewards program.

* * * * *